US008689420B2

(12) United States Patent
Barrios et al.

(10) Patent No.: US 8,689,420 B2
(45) Date of Patent: Apr. 8, 2014

(54) APPARATUS AND METHOD FOR INSTALLING AND REMOVING WHEEL STUDS

(75) Inventors: Jose O. Barrios, Owatonna, MN (US); John Nicholas Lindberg, Mankato, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 0 days.

(21) Appl. No.: 13/097,488

(22) Filed: Apr. 29, 2011

(65) Prior Publication Data

US 2011/0219617 A1 Sep. 15, 2011

Related U.S. Application Data

(63) Continuation-in-part of application No. 11/878,869, filed on Jul. 27, 2007, now abandoned.

(51) Int. Cl.
*B23P 19/02* (2006.01)

(52) U.S. Cl.
USPC .................................. 29/257; 269/3; 269/249

(58) Field of Classification Search
USPC ......................... 29/257; 81/53.2; 269/76, 1, 3
See application file for complete search history.

(56) References Cited

U.S. PATENT DOCUMENTS

| | | | | |
|---|---|---|---|---|
| 569,527 | A | | 10/1896 | Tilton |
| 2,549,429 | A | | 4/1951 | Cowles |
| 2,798,392 | A | | 7/1957 | Randolph |
| 3,237,291 | A | | 3/1966 | Kelso |
| 3,862,483 | A | | 1/1975 | Kloster |
| 4,624,039 | A | | 11/1986 | Lawrence |
| 4,940,370 | A | | 7/1990 | Gipson |
| 4,976,280 | A | | 12/1990 | Lagana |
| 5,271,136 | A | * | 12/1993 | Skoworodko .................. 29/257 |
| 5,586,378 | A | | 12/1996 | Smith |
| 5,692,437 | A | | 12/1997 | Tabain |
| 5,839,180 | A | | 11/1998 | Hochmiller |
| 6,505,390 | B2 | | 1/2003 | Emanuel |
| 6,618,920 | B1 | | 9/2003 | Emanuel |
| 6,789,791 | B2 | | 9/2004 | Genduso |
| 7,093,809 | B2 | | 8/2006 | Hwang |
| 2006/0070221 | A1 | * | 4/2006 | Wridt et al. .................. 29/281.1 |

OTHER PUBLICATIONS

"OTC Tools & Equipment for the Professional Catalog," 1997, pp. 75 and 76.

(Continued)

*Primary Examiner* — Lee D Wilson
*Assistant Examiner* — Jamal Daniel
(74) *Attorney, Agent, or Firm* — Baker & Hostetler LLP

(57) ABSTRACT

A wheel stud installing and removing system includes a C-frame; a forcing screw configured to communicate with the C-frame to move laterally through the C-frame; a swivel mounted on an end on the forcing screw; an adapter receiver mounted on an opposite end of the C-frame from the forcing screw, and configured to receive at least one of either a stud installing adapter and a stud removing adapter. A method of moving a stud includes: inserting one of either an installing adapter or a removing adapter into an adapter receiver on a C-frame; aligning a longitudinal axis of the adapter with a longitudinal axis of the stud; aligning the longitudinal axis of the stud with a longitudinal axis of a forcing screw; and turning the forcing screw.

12 Claims, 10 Drawing Sheets

(56) References Cited

OTHER PUBLICATIONS

"Form No. 104950," OTC Parts List and Operating Instructions for C-Frame # 7248 and Tool Set # 7249; 1990, Sheet 1, Sheet 1 Back, Sheet 2.
"Form No. 105816," OTC Parts List and Operating Instructions for 4WD Ball Joint Service Kit #7704; 1994, Sheet 1, Sheet 1 Back.
"OTC Automotive Tools and Equipment Catalog," 1975, p. 21.
"OTC Tools and Equipment Catalog," 1980, pp. 16 and 17.
"OTC Tools and Equipment Catalog," 1983, pp. 30, 42, and 97.
"OTC Tools and Equipment Catalog," 1990, pp. 62-64.
"Kent-Moore General Rate Maker Service Tools Catalog," 1970, p. 83.
"Kent-Moore General Rate Maker Service Tools Catalog," 1994, p. 52.
"Form No. 106214," OTC Parts List and Operating Instructions for Brake Anchor Pin and Bushing Service Set, 1998, Sheet 1, Sheet 1 Back.
"OTC Tools and Equipment Catalog," 1988, pp. 50 and 51.
TSI/Tire Service Equipment Mfg. Co. Inc., "1-PPK Pak PressTM—Portable Wheel Stud Remover and Installer" catalog, 3 pp. (www.tigertool.com/images/tools/pictures/10603a.jpg), Oct. 6, 2006.
"Tools & Equipment for the professional" catalog, 2 pp., 1993.

* cited by examiner

APPARATUS AND METHOD FOR INSTALLING AND REMOVING WHEEL STUDS

CROSS-REFERENCE TO RELATED APPLICATIONS

This is a Continuation in Part Application and claims priority to U.S. patent application Ser. No. 11/878,869, entitled WHEEL STUD INSTALLING AND REMOVING SYSTEM AND METHOD, filed Jul. 27, 2007, the disclosure of which is incorporated herein, by reference.

FIELD OF THE INVENTION

The present invention relates generally to installing and removing shafts within a hole. More particularly, the present invention relates to installing and removing wheel studs on a hub assembly.

BACKGROUND OF THE INVENTION

Wheeled vehicles have wheel assemblies, which usually consist of a rubber tire connected to a metal wheel rim. The metal wheel rim, which is often steel or aluminum, is equipped with an array of holes. The wheel assembly is fitted to the vehicle by aligning the holes in the wheel rim with studs mounted in a hub assembly. Once the holes in the wheel rim have been aligned with the studs, the wheel assembly is placed onto the hub assembly causing the studs to extend through the holes in the wheel rim. The wheel is then secured onto the hub assembly with lug nuts tightened onto the studs.

From time to time, and for various reasons, the studs may need to be replaced. For example, a stud may break. In other instances, the threads on the stud, to which the lug nuts attach, may become stripped or otherwise damaged.

Often, the studs are bolts that extend through a flat disc portion of the hub assembly. Often, the studs are press fit into the holes in the flat disc portion of the hub assembly. On one side of the flat portion of the hub assembly, the studs have heads. The heads prevent the studs from moving completely through the hub and permit the wheel assembly to be tightly attached to the hub assembly when the nuts are torqued onto the studs.

Because the studs are often press fit into their respective holes in the hub assembly, installing and removing studs to and from the hub assembly may be difficult to do by hand.

Some tools have been developed in order to facilitate installing and removing studs from the hub assembly. Some known systems use tools that grip the stud by the threads and apply force through the studs via the threads to install or remove the stud. While these systems may work well in some applications, other applications may lend themselves to be well served by tool systems that remove or install the stud by applying force to the stud at places other than the threads.

An issue to consider is that the studs are installed on a flat disc portion of the hub assembly. The flat disc portion of the hub assembly may be subject to being warped or otherwise deformed if a tool installing or removing a stud applies an undesirable amount of force to the flat disc portion of the hub assembly. Thus, a system that supports the hub or reduces the force applied to the hub is desired. Moreover, a system and method that is relatively simple and easy to use is desired.

SUMMARY OF THE INVENTION

The foregoing needs are met, to a great extent by the present invention, wherein in one aspect an apparatus and method is provided that in some embodiments, a stud is installed or removed from a flat disc portion of a wheel hub. A substantial amount or all of the force used to install or remove the wheel stud is applied to an end portion of the stud other than the stud's threads.

In addition, in some embodiments of the invention, force that is applied to the flat disc portion of the hub assembly is done in such a manner and at such levels as to not significantly warp, bend, deform or otherwise permanently alter the geometry of the flat disc portion of the wheel assembly when a stud is removed or installed. Finally, in some embodiments of the present invention, the system and method for installing and removing wheel studs is a relatively simply, economical and easy to use system and method.

In accordance with one embodiment of the present invention a wheel stud installing and removing system is provided. According to some embodiments of the invention, the system includes: a C-frame; a forcing screw configured to communicate with the C-frame to move laterally through the C-frame; and a swivel mounted on an end on the forcing screw; an adapter receiver mounted on an opposite end of the C-frame from the forcing screw, and configured to receive at least one of either a stud installing adapter and a stud removing adapter. The stud installing adapter and/or the stud removing adapter can include a bore hole extending all the way through the adapter.

In accordance with another embodiment of the present invention, a method of moving a stud is provided. In some embodiments of the invention the method includes inserting one of either an inserting adapter or a removing adapter into an adapter receiver on a C-frame; aligning a longitudinal axis of the adapter with a longitudinal axis of the stud; aligning a longitudinal axis of a forcing screw; and turning the forcing screw.

In accordance with yet another embodiment of the present invention, a wheel stud installing and removing system is provided. According to some embodiments of the invention, the system includes: a frame; means for forcing configured to communicate with the frame to move laterally through the frame; means for swiveling mounted on an end on the forcing means; and means for receiving an adapter mounted on an opposite end of the frame from the forcing means, and configured to receive at least one of either a stud installing adapter and stud removing adapter.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 2:
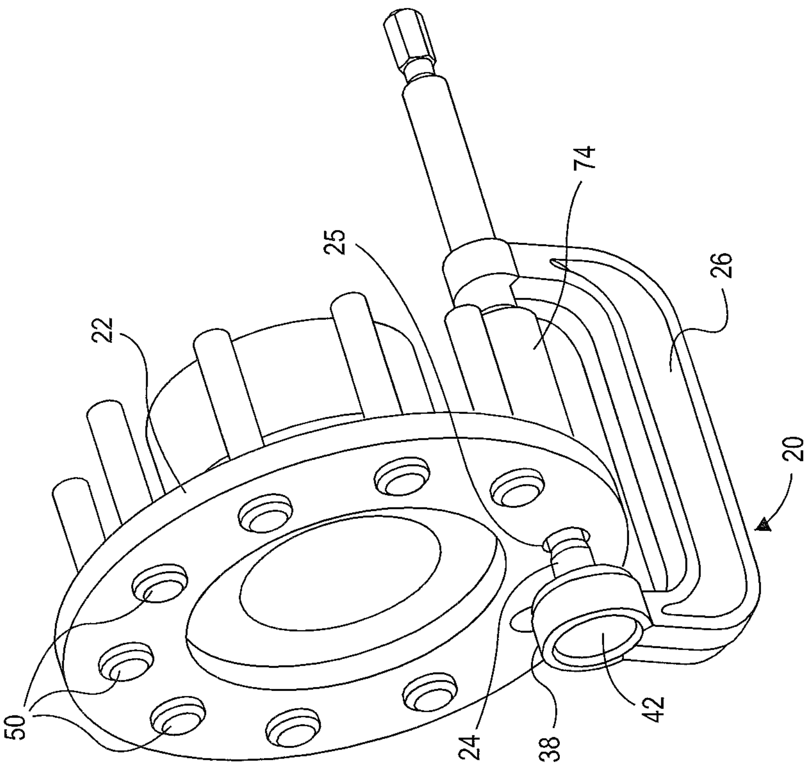
FIG. 2 is a perspective view taken from a different angle of that shown in FIG. 1 of the embodiment illustrated in FIG. 1.

The invention will now be described with reference to the drawing figures in which like reference numerals refer to like parts throughout. An embodiment of the invention provides a system and method for installing and removing wheel studs onto and off of a wheel hub. An embodiment of the present inventive system is illustrated in FIG. 1.

Figure 1:
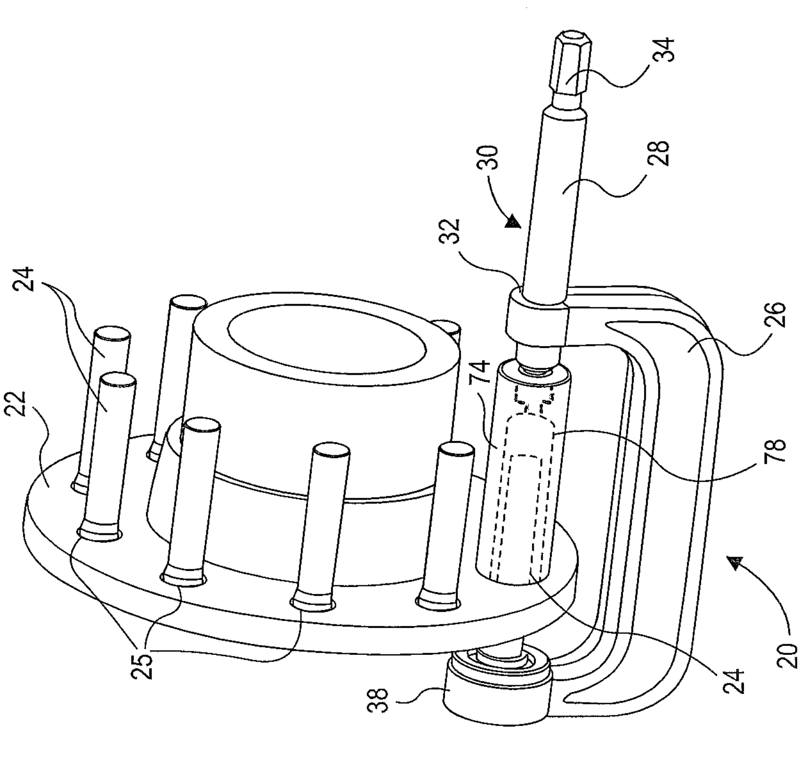
FIG. 1 is a perspective view illustrating a system and method for installing a wheel stud on a hub assembly in accordance with one embodiment of the invention.

FIG. 1 shows a system 20 in accordance with the invention. The system 20 is shown engaged with a wheel hub 22. In the wheel hub 22 are studs 24. The studs 24 are press fit into holes 25 in the hub 22. It is common for studs 24 when fully installed, to be press fit into the holes 25 so tightly that the studs 24 cannot be removed easily by hand. Rather, tools are often used in order to remove the studs 24. Likewise, installing studs 24 into the holes 25 of the hub 22 also is often done with tools because of the tight fit between the stud 24 and the hole 25.

In accordance with the present invention, a wheel stud installing and removing system and method will now be described. The wheel stud installing and removing system 20 includes a C-frame 26. The C-frame 26 has mounted in it a forcing screw 28. The forcing screw 28 includes external threads 30, which are located about the perimeter of the forcing screw 28. The forcing screw 28 extends through a threaded hole 32 on the C-frame 26. The threads 30 on the forcing screw 28 interact with the threaded hole 32 in order to permit the forcing screw 28 to move longitudinally through the threaded hole 32 on the C-frame 26 when the forcing screw 28 is rotated.

In some embodiments of the invention, rotating the forcing screw 28 in one direction will cause the forcing screw 28 to move away from the hub 22. Rotating the forcing screw 28 in the opposite direction will cause the forcing screw 28 to move toward the hub 22.

Some embodiments of the invention include a hex head 34 located on the forcing screw 28. The hex head 34 permits tools such as an impact wrench, socket, or any other type of wrench to assist in turning the forcing screw 28.

In other embodiments of the invention, other suitable structure may be located on the forcing screw 28 in order for the forcing screw 28 to be more easily turned by either hand or tools.

Figure 9:
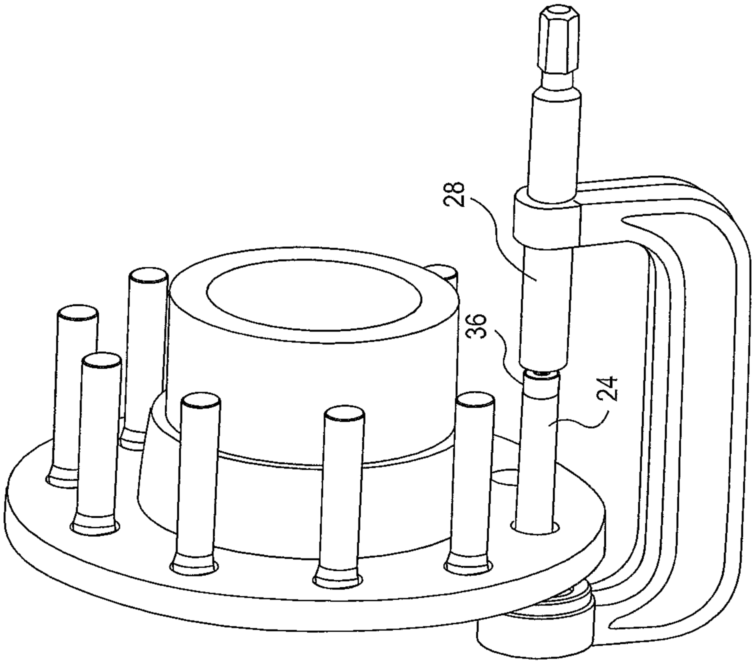
FIG. 9 is a perspective view of a wheel stud installing and removing system in the process of removing a wheel stud from a hub assembly according to one embodiment of the invention.
Figure 12:
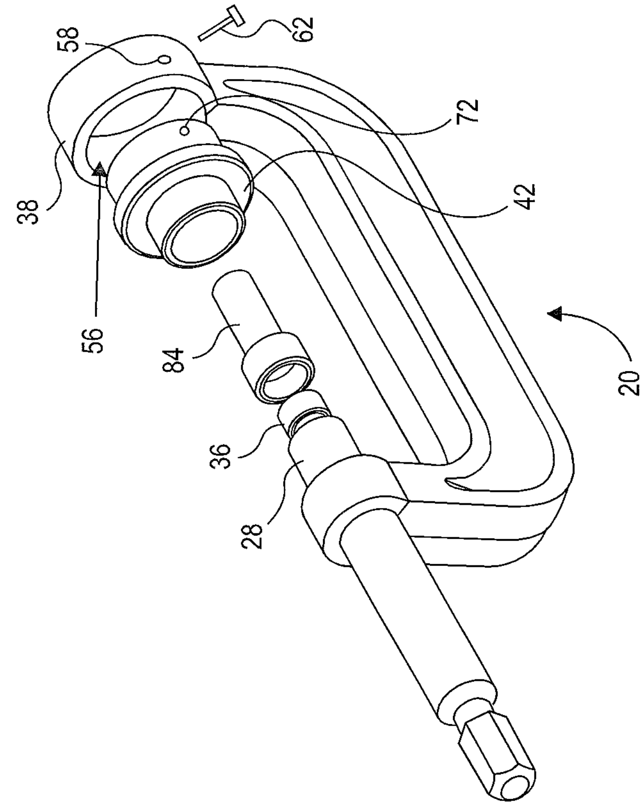
FIG. 12 is an exploded view of a wheel stud installing and removing system with the wheel stud removing adapters shown in either FIGS. 4 and 5, and the wheel stud removing adapter of FIG. 6.

On the opposite end of the forcing screw 28 from the hex head 34 is a swivel 36 (best shown in FIGS. 9 and 12). The swivel 36 rotates freely on the end of the forcing screw 28. Thus, when the forcing screw 28 is rotated against the stud 24 as shown in FIG. 9, the forcing screw 28 does not impart a significant rotational force against the stud 24. Further, the swivel 36 will also not impart a significant rotational force against adapters when the adapters are placed on the end of the forcing screw 28 as will be described with respect to other figures below.

Turning to FIG. 1, the C-frame 26, on an end opposite to that which the forcing screw 28 is mounted, has a looped receiver 38. The looped receiver 38 is best shown in FIG. 12. As shown, at least in part in several of the figures, the looped receiver 38 is a large loop that is configured to receive and, at least in part, support adapters that will be described in more detail below.

The term adapter herein generally refers to different parts of a stud installing and moving system that is installed or removed on the C-frame 26 and/or forcing screw 28 depending on how the system 20 is to be used. For example, one type of adapter that the looped receiver 38 can receive is a stud installing head 40 best shown in FIG. 8. The stud installing head 40 is used to install studs 24 into the hub 22. When it is desired to remove the studs 24 from the hub 22, the stud installing head 40 can be removed from the looped receiver 38 and replaced with a stud removing head 42 shown in FIGS. 4 and 5.

Figure 4:
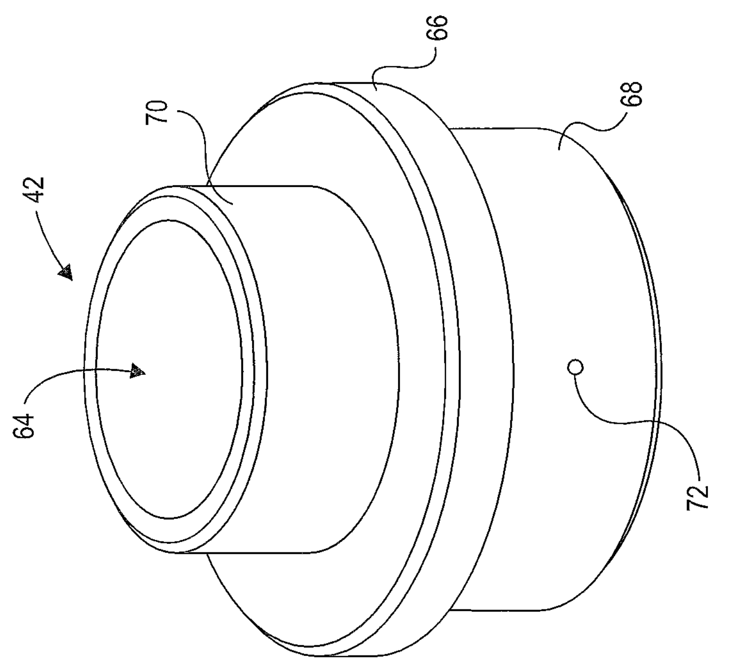
FIG. 4 is a perspective view of a stud removing adapter that is shown in operation in FIG. 3.
Figure 5:
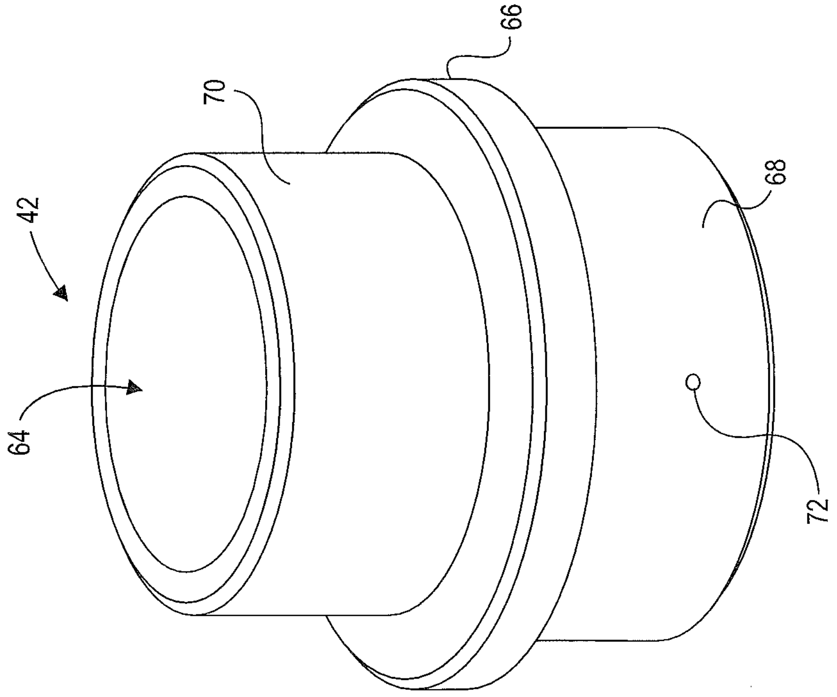
FIG. 5 is a perspective view of a wheel stud removing adapter having a slightly different geometry then the wheel stud removing adapter shown in FIG. 4.

The difference between the stud removing heads 42 shown in FIGS. 4 and 5 is primarily the difference in size between the stud remover heads. The stud removing head 42 shown in FIG. 4 is for use with smaller sized studs 24 and the stud removing head 42 shown in FIG. 5 is used with larger sized studs 24 associated with large trucks and heavy pieces of equipment.

FIGS. 1 and 2 illustrate the system 20 configured to install a wheel stud 24 into a hub 22. In some embodiments of the invention, when the system 20 is configured for installing wheel studs 24, the stud installing head 40 is installed into the looped receiver 38 of the C-frame 26 as shown.

Figure 3:
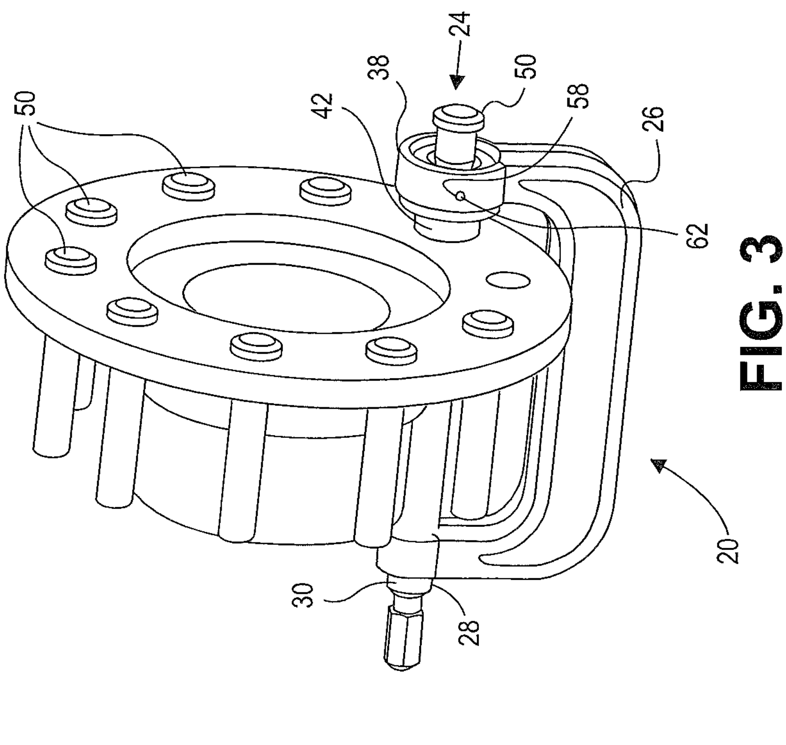
FIG. 3 is a perspective view of a wheel stud installing and removing system according to an embodiment of the invention, showing a step in the process of removing a wheel stud from a hub assembly.
Figure 8:
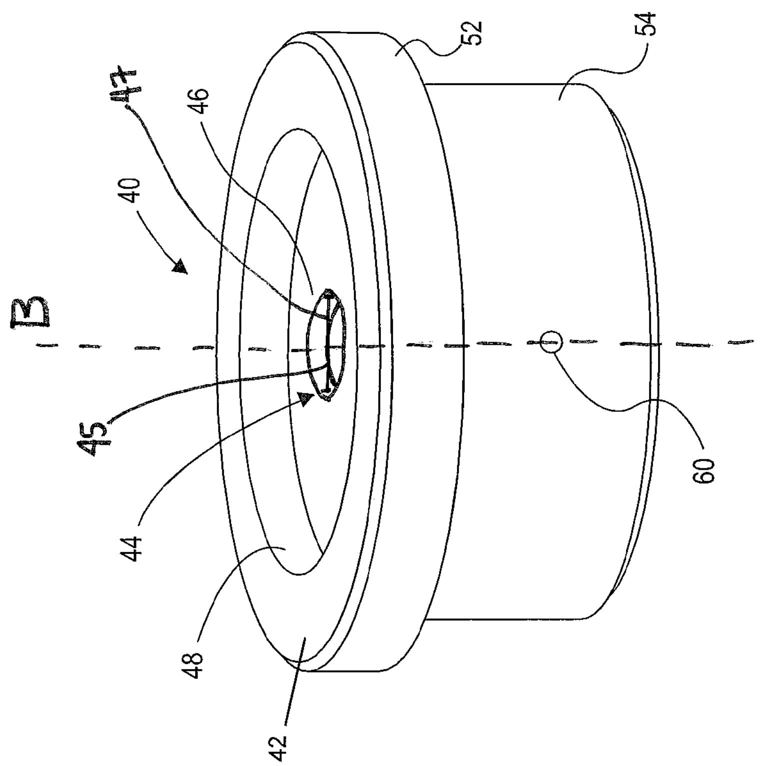
FIG. 8 is a perspective view of a stud installing adapter used in conjunction with the stud installing adapter of FIG. 7 in some embodiments of the invention.
Figure 10:
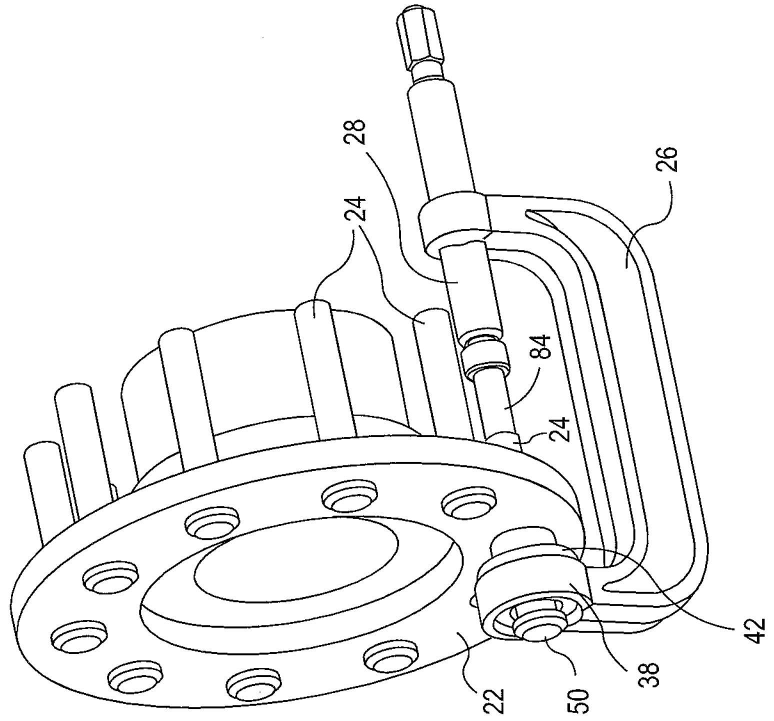
FIG. 10 is a perspective view of a wheel stud installing and removing system in the process of removing a stud from a hub assembly using one of the adapters shown in either FIG. 4 or 5 and the adapter shown in FIG. 6.

As shown in FIG. 8, the stud installing head 40 includes a longitudinal axis "B". The stud installing head 40 includes a depression 44 in a receiving end 42 of the installing head 40. The depression 44 is positioned about the longitudinal axis "B". At the bottom of the depression 44 is a contact surface 46 surrounded by a side wall 48. In some embodiments of the invention, the diameter of the depression 44 and the depth of the side wall 48 to the contact surface 46 of the installing head 40 corresponds with the size of the head 50 (as shown in FIGS. 2, 3 and 10) of a stud 24. The size and depth of the depression 44, in some embodiments of the invention, is such that the head 50 can be secured within a depression 44 and the contact surface 46 can contact the head 50 and not have the rim 52 be contacting, or be lightly contacting the hub 22 when the stud 24 has been fully installed into the hole 25.

Additionally, the stud installing adapter 40 can include a bore hole 45 which is defined by the contact surface 46 and is positioned about the longitudinal axis "B". The bore hole 45 can have a diameter 47 which is less than that of the head 50 of the stud. The bore hole 45 can extend through the contact surface 46 of the stud installing head 40 along longitudinal axis "B". The bore hole 45 reduces the weight of the stud installing head 40. The bore hole 45 can also be utilized to secure the installing head 40 within its packaging. For instance a projection having a diameter corresponding to the diameter of the bore hole 45 could be included in the wheel stud installing and removing system packaging. In turn, securing the stud installing head 40 within the packaging can minimize movement of the stud installing head 40 and limit any potential damage to the components within the packaging.

The stud installing head 40 includes a rim 52 and a narrow portion 54. The narrow portion 54 of the installing head 40 is dimensioned to fit within the hole 56 in the looped receiver 38 as shown in FIG. 12.

The rim 52 has a wider diameter than the narrow portion 54. Therefore the rim 52 does not enter the hole 56 of the looped receiver 38. The rim 52 is dimensioned to be large enough to withstand force applied to it from the looped receiver 38 when the system 20 is urging a stud 24 into a hub 22.

In some embodiments of the invention, the looped receiver 38 is equipped with a small cross hole 58, as shown in FIGS. 3 and 12. A thumb screw 62 is turned in the cross hole 58 and an end portion of the screw 62 holds the stud installing head 40 in the looped receiver 38 by a friction fit. In other embodiments of the invention, a corresponding cross hole 60 is found in the narrow portion 54 of the stud installing head 40, shown in FIG. 8. The cross holes 58 and 60 can be threaded and lined up so that they are aligned and a screw or pin 62 can be placed in the cross holes 58 and 60 to secure the stud removing head 22 to the C-frame 26.

Figure 7:
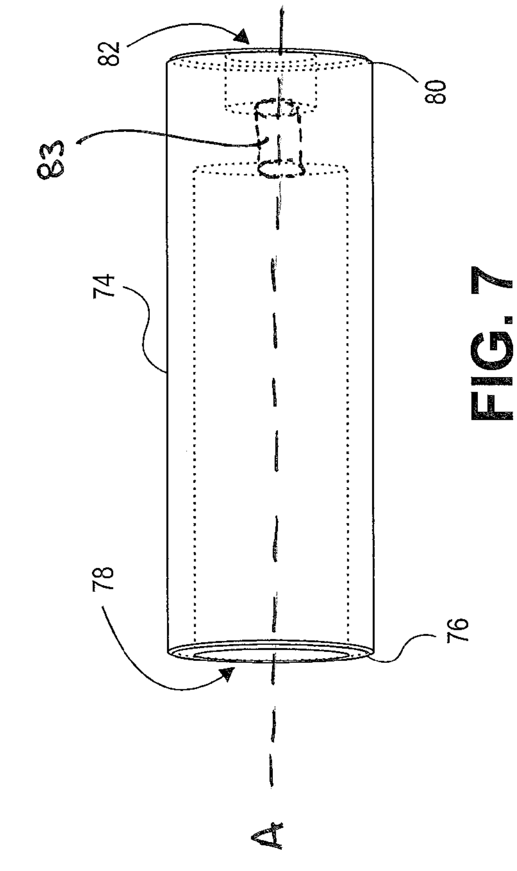
FIG. 7 is a perspective view of a stud installing adapter used in some embodiments of the invention.

To remove the stud installing head 40 from the looped receiver 38, the screw or pin 62 affixed thereto is removed and then the stud installer head 40 can be removed from the looped receiver 38. When performing a stud 24 installing operation, an installing adapter 74, best shown in FIG. 7, but also shown in FIGS. 1 and 2, is used. As shown in FIG. 7, the installing adapter 74 has a bearing end 76. The bearing end 76 is primarily a flat surface with chamfered edges. The bearing end 76 urges against the hub 22 as shown in FIG. 1 when a stud 24 is being installed into the hole 25 on the hub 22.

The installing adapter 74 includes a longitudinal axis "A." The installing adapter 74 has a stud receiving hole 78 positioned about the longitudinal axis "A" that is open to the bearing end 76 and extends through, but in some embodiments of the invention, not all the way through the installing adapter 74. Opposite the bearing end 76, on the installing adapter 74, is a swivel engaging end 80. In the swivel engaging end 80 is a swivel hole 82 extending through the swivel engaging end 80. The swivel engaging hole 82 is defined by the swivel engaging end 80 of the installing adapter 74 and also is positioned about the longitudinal axis "A" of the installing adapter 74. The swivel engaging end 80 can further define a bore hole 83 positioned about the longitudinal axis "A" and between the swivel engaging hole 82 and the stud receiving hole 78. The bore hole 83 connects the swivel engaging hole 82 and the stud receiving hole 78, and can have a diameter slightly less than that of the swivel engaging hole 82. Providing the bore hole 83 results in less material present in the installing adapter and therefore a lighter more portable installing adapter 74.

The stud installing adapter 74 is fit onto the swivel 36 of the forcing screw 28 as shown in FIGS. 1 and 2. The swivel hole 82 is dimensioned to permit the swivel 36 to fit within the swivel hole 82. The forcing screw 28 is turned until the bearing end 76 of the installing adapter 74 is fit up against the hub 22. As shown in FIGS. 1 and 2, a stud 24 extends into the stud receiving hole 76 in the installing adapter 74.

As the forcing screw 28 is turned, the hub 22 is forced toward the looped receiver 38. The stud installing head 40 provides a stop for the stud 24 so that the stud 24 is held more or less in place while the hub 22 continues to move toward the looped receiver 38. An alternative way to consider the motion is that the hub 22 remains stationary and the head 50 and looped receiver 38 move toward the hub 22. Thus, in effect, the stud 24 is installed into the hole 25 on the hub 22.

The forcing screw 28 provides force in the installing adapter 74 to the hub 22 to counter force applied to the hub 22 from the stud 24. The swivel 26 reduces or eliminates the amount of twisting force applied to the installing adapter 74.

In order to remove a stud 24 from the hub 22, the system 20 is modified so that the stud installing head 40 is removed from the looped receiver 38, and the stud removing head 42 is installed in its place. Further, the installing adapter 74 is removed from the forcing screw 28.

A system 20, in accordance with one embodiment of the invention, configured for removing a stud 24 from a hub 22, is illustrated in FIGS. 3 and 9. Turning now to FIG. 3, the stud removing and installing system 20 is shown. The C-frame 26 is placed so that the forcing screw 28 is aligned with a stud 24. The stud removing head 42 is installed into the looped receiver 38 and secured to the looped receiver 38 with a screw or pin 62. The through-hole 64 in the stud removing head 42 is aligned so that the stud 24 and the head 50 can extend through the through-hole 64 as the forcing screw 28 pushes the stud 24 through the hole 25 in the hub 22, as shown in FIG. 3.

The guide section 70 of the stud removing head 42 is placed on the hub 22 around the head 50 of the stud 24. Then the forcing screw 28 is turned, and as it turns, the external threads 30 on the forcing screw 28 interact with the threaded hole 32 in the C-frame 26 to move the forcing screw 28 longitudinally toward the looped receiver 28. The swivel 36 (best shown in FIG. 9) contacts the stud 24, and as the forcing screw 28 continues to travel, the stud 24 is pushed out of the hole 25 in the hub 22.

As shown in FIG. 10, the guide section 70 of the stud removing head 42 provides opposing force to resist the movement of the hub 22 as the stud 24 is urged forward and then through the looped receiver 38.

Figure 11:
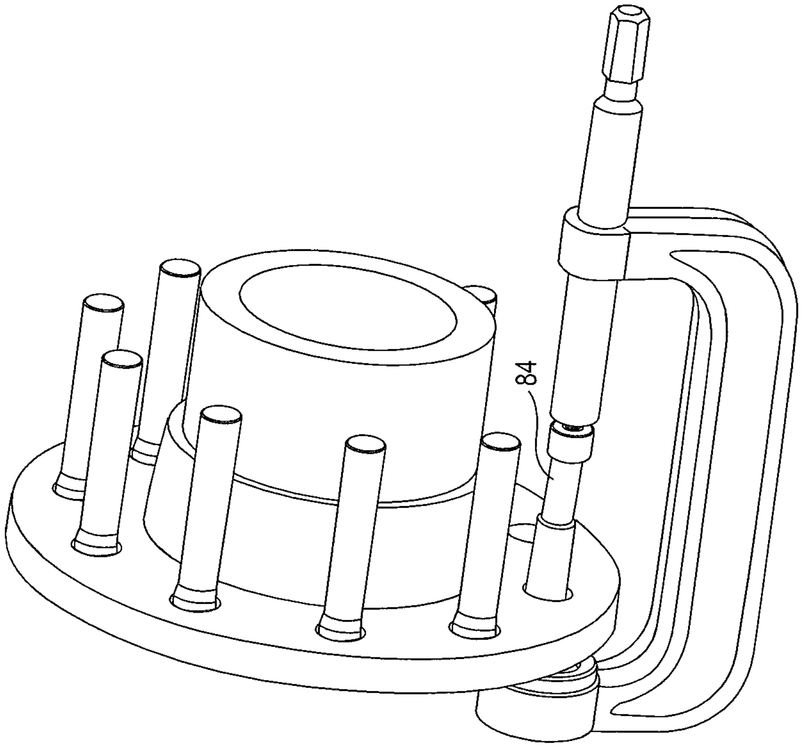
FIG. 11 is a perspective view of the wheel hub and wheel stud installing and removing system shown in FIG. 10 taken from a different angle than that illustrated in FIG. 10.

Occasionally, a stud 24 may break off or the system 20 may be used where shorter than average studs 24 are installed on a hub 22. In such instances, and in some embodiments of the invention, the system 20 can be fitted with an extension adapter 84 best shown in FIG. 6, but also illustrated in FIGS. 10-12.

Figure 6:
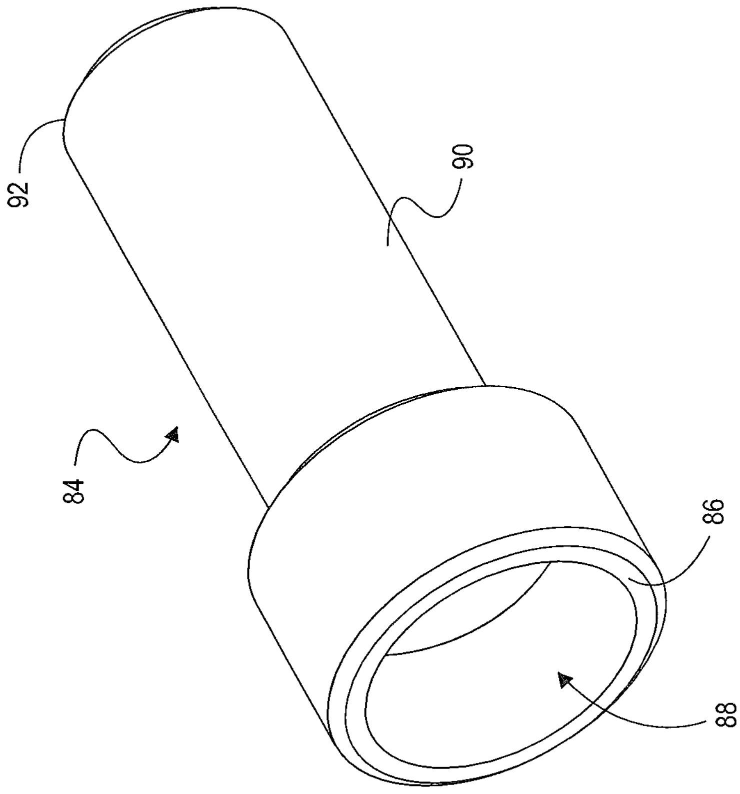
FIG. 6 is a perspective view of a stud removing adapter that is used in some embodiments of the current invention.

Turning now to FIG. 6, the extension adapter 84 has a swivel receiving end 86. The swivel receiving end 86 includes a swivel receiving hole 88. The swivel receiving hole 88 is dimensioned so that the swivel 36 located on the end of the forcing screw 28 can fit or be seated in the swivel receiving hole 88 and secure the extension adapter 84 onto the swivel 36 thereby. The extension adapter 84 also includes a shaft 90 and a stud bearing end 92. The stud bearing end 92 urges against the end of a stud 24 when in use to remove a stud 24 as illustrated in FIG. 10.

FIG. 10 illustrates a case where the extension adapter 84 has been fitted onto the forcing screw 28. The forcing screw 28 has been turned and pushes the stud 24 out of the hub 22. The head 50 of the stud 24 is shown extending through the stud removing head 42 fit in the looped receiver 38 of the C-frame.

In some embodiments of the invention, the forcing screw 28 can completely push the stud 24 out of the hole 25 in the hub 22. In other embodiments of the invention, the forcing screw 28 is used to push the stud 24 out of the hole 25 in the hub 22 far enough so that the portion of the stud 24 nearest the head 50 has a larger diameter than the rest of the stud 24, is moved out of the hole 25. At that point, the stud 24 is no longer press fit within the hole 25 of the hub 22 and may then be removed by hand.

FIG. 12 is an exploded view of the system 20 configured for removing studs 24. The optional extension adapter 84 is shown to be aligned with the forcing screw 28. The stud removing head 42 is shown as having not yet entered the hole 56 in the looped receiver 38 and the pin or screw 62 has not yet entered the holes 58 and 72 to secure the stud removing head 42 to the looped receiver 38.

Thus, in some embodiments of the invention, the system 20 having a C-frame has different heads 40, 42 that can be installed into the looped receiver 38 depending on whether a user wants to install or remove studs 24 from a hub 22. Further, different adapters 74 and 84 are attached to the forcing screw 28 depending on whether a user intends to remove or install a stud 24 into a hub 22. In some embodiments of the invention, the installing adapter 74 is put on the forcing screw 28 when it is desired to install a stud 24 to a hub 22. No adapter can be used, in some embodiments of the invention, when it is desired to remove a stud 24 from a hub 22. But in some embodiments of the invention, extension adapter can be fitted onto the forcing screw 28 in order to facilitate the moving of the stud 24 from the hub 22.

Figure 14:
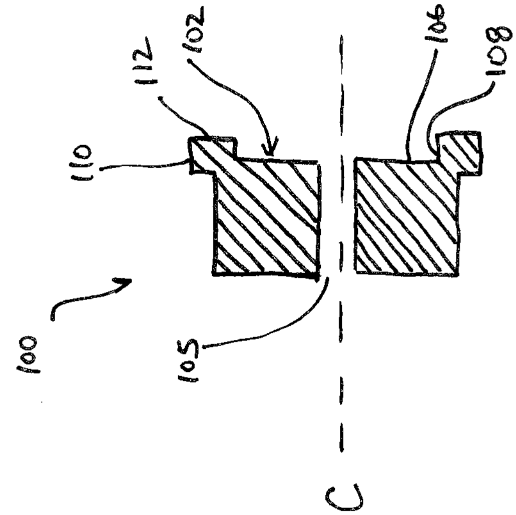
FIG. 14 illustrates a cross-sectional view of the embodiment illustrated in FIG. 13.
Figure 13:
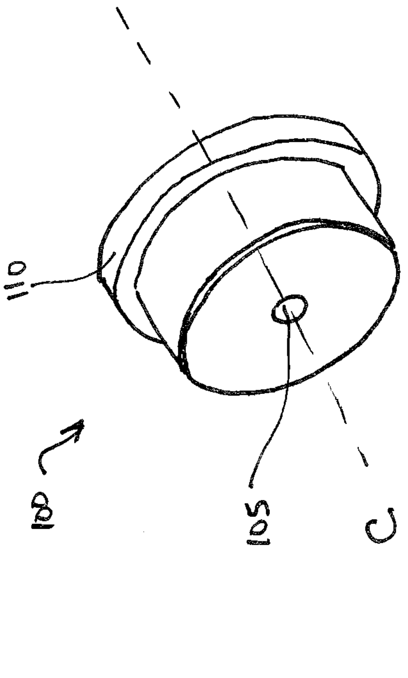
FIG. 13 illustrates a perspective embodiment of an installing adapter in accordance with the invention.

FIG. 13 illustrates an perspective embodiment of an installing adapter in accordance with the invention and FIG. 14 illustrates a cross sectional view of the embodiment of FIG. 13. The installing adapter 100 includes a longitudinal axis "C". The stud installing head 100 includes a depression 102 in a receiving end 104 of the installing head 100. The depression 102 is positioned about the longitudinal axis "C". At the bottom of the depression 102 is a contact surface 106 surrounded by a side wall 108. In some embodiments of the invention, the diameter of the depression 102 and the depth of the side wall 108 to the contact surface 106 of the installing head 100 corresponds with the size of the head 50 (as shown in FIGS. 2, 3 and 10) of a stud 24. The size and depth of the depression 102, in some embodiments of the invention, is such that the head 50 can be secured within a depression 102 and the contact surface 106 can contact the head 50 and not have the rim 110 be contacting, or be lightly contacting the hub 22 when the stud 24 has been fully installed into the hole 25.

Additionally, the stud installing adapter 100 can include a bore hole 105 which is defined by the contact surface 106 and is positioned about the longitudinal axis "C". The bore hole 105 can have a diameter 107 which is less than that of the head 100 of the stud. The bore hole 105 can extend through the contact surface 106 of the stud installing head 100 along longitudinal axis "C". The bore hole 105 reduces the weight of the stud installing head 100. The bore hole 105 can also be utilized to secure the installing head 100 within its packaging. For instance a projection having a diameter corresponding to the diameter of the bore hole 105 could be included in the wheel stud installing and removing system packaging. In turn, securing the stud installing head 100 within the packaging can minimize movement of the stud installing head 100 and limit any potential damage to the components within the packaging.

The stud installing head 100 includes a rim 110 and a narrow portion 112. The narrow portion 112 of the installing head 100 is dimensioned to fit within the hole 56 in the looped receiver 38 as shown in FIG. 12.

The rim 110 has a wider diameter than the narrow portion 112. Therefore the rim 110 does not enter the hole 56 of the looped receiver 38. The rim 110 is dimensioned to be large enough to withstand force applied to it from the looped receiver 38 when the system 20 is urging a stud 24 into a hub 22.

Figure 16:
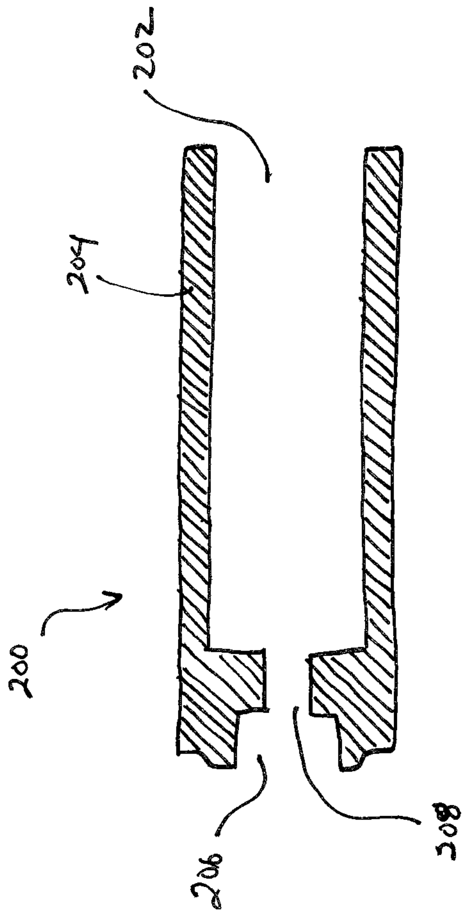
FIG. 16 illustrates a cross-sectional view of the embodiment illustrated in FIG. 15.
Figure 15:
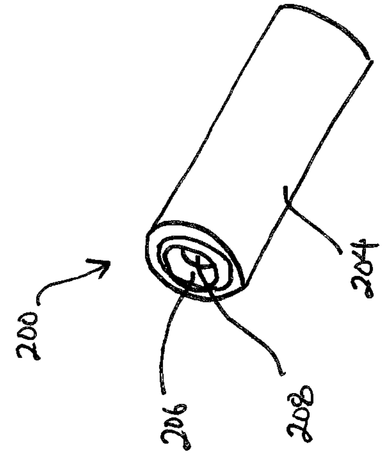
FIG. 15 illustrates a perspective view of a receiving cup in accordance with the invention.

FIG. 15 illustrates a perspective view of a receiving cup in accordance with an embodiment of the invention, and FIG. 16 illustrates a cross-sectional view of the embodiment of FIG. 15. The receiving cup 200 of FIGS. 15 and 16 is configured to receive an end of the wheel stud 24. It can be positioned between the end of the forcing screw 28 and the end of the wheel stud 24, as illustrated in FIG. 2. The wheel stud 24 is received in the hollowed out region 202 defined by an outer wall 204 of the receiving cup 200, which extends longitudinally through the receiving cup 200. The end of the forcing screw 28 can couple with the forcing screw coupler 206, also defined by the outer wall 204 of the receiving cup. The hollowed out region 202 and the forcing screw coupler 206 are connected by a bore hole 208. The bore hole has a smaller diameter than that of the hollowed out area 202 and the forcing screw coupler 206. The bore hole 208 can reduce the weight of the receiving cup 200.

Figure 18:
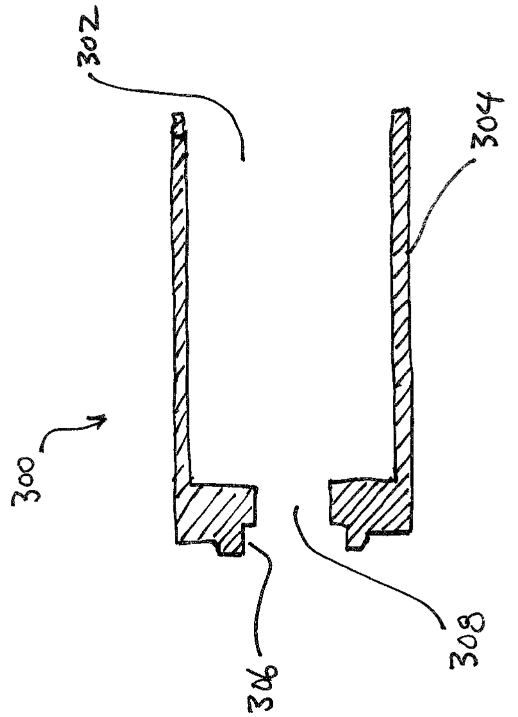
FIG. 18 illustrates a cross-sectional view of the embodiment illustrated in FIG. 17.
Figure 17:
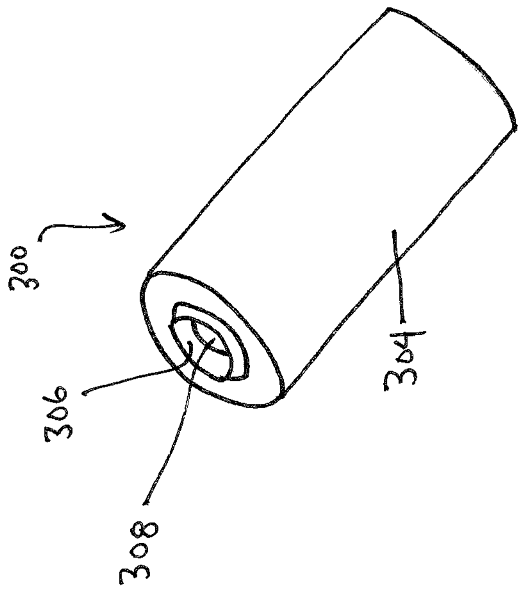
FIG. 17 illustrates a perspective view of an installing cup in accordance with the invention.

FIG. 17 illustrates a perspective view of an installing cup, in accordance with an embodiment of the present invention, and FIG. 18 illustrates a cross-sectional view of the embodiment of FIG. 17. The installing cup 300 of FIGS. 17 and 18 is configured to receive an end of the wheel stud 24 during installation. It can be positioned between the end of the forcing screw 28 and the end of the wheel stud 24, as illustrated in FIG. 2. The wheel stud 24 is received in the hollowed out region 302 defined by an outer wall 304 of the installing cup 300, which extends longitudinally through the receiving cup 300. The end of the forcing screw 28 can couple with the forcing screw coupler 306, also defined by the outer wall 304 of the receiving cup. The hollowed out region 302 and the forcing screw coupler 306 are connected by a bore hole 308. The bore hole has a smaller diameter than that of the hollowed out area 302 and the forcing screw coupler 306. The bore hole 308 can reduce the weight of the receiving cup 300.

Figure 20:
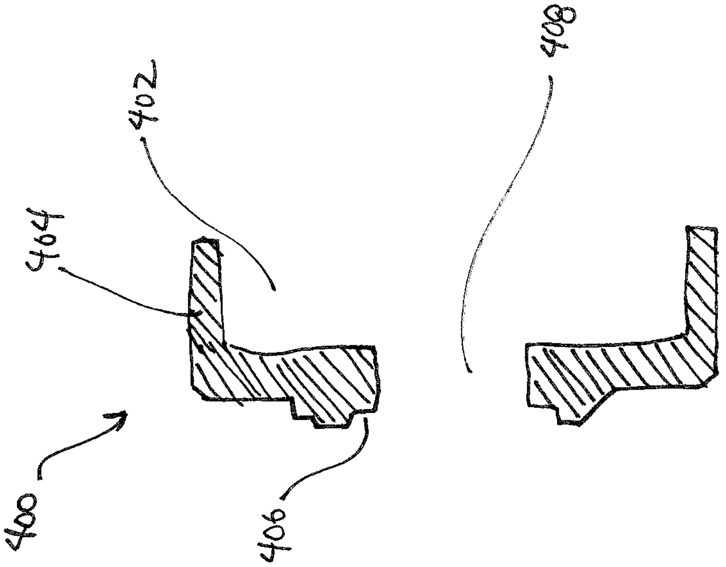
FIG. 20 illustrates a cross-sectional view of the embodiment illustrated in FIG. 19.
Figure 19:
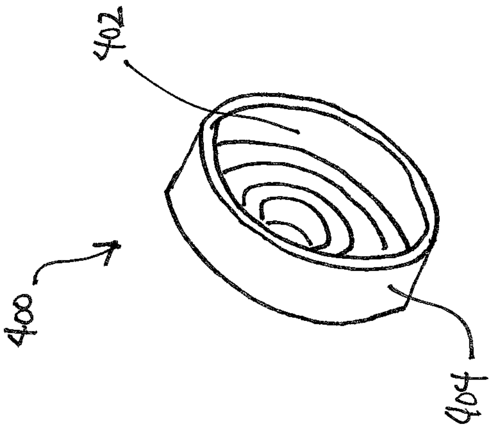
FIG. 19 illustrates a perspective view of a receiving cup in accordance with another embodiment of the invention.

FIG. 19 illustrates a perspective view of a receiving cup in accordance with an embodiment of the invention, and FIG. 20 illustrates a cross-sectional view of the embodiment of FIG. 19. The receiving cup 400 of FIGS. 19 and 20 is configured to receive an end of the wheel stud 24. It can be positioned between the end of the forcing screw 28 and the end of the wheel stud 24, as illustrated in FIG. 2. The wheel stud 24 is received in the hollowed out region 402 defined by an outer wall 404 of the receiving cup 400, which extends longitudinally through the receiving cup 400. The end of the forcing screw 28 can couple with the forcing screw coupler 406, also defined by the outer wall 404 of the receiving cup. The hollowed out region 402 and the forcing screw coupler 406 are connected by a bore hole 408. The bore hole has a smaller diameter than that of the hollowed out area 402 and the forcing screw coupler 406. The bore hole 408 can reduce the weight of the receiving cup 400. As illustrated by the contrast between the receiving cup illustrated in FIGS. 15 and 16 and the receiving cup illustrated in FIGS. 19 and 20, the receiving cup can vary in size and diameter based on the diameter and the length of the wheel stud 24.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A wheel stud installing and removing system comprising:

- a C-frame;
- a forcing screw configured to communicate with the C-frame to move laterally through the C-frame;
- a swivel mounted on an end on the forcing screw;
- a receiver mounted on an opposite end of the C-frame from the forcing screw, and configured to receive at least one of either a stud installing head and a stud removing head; and
- an extension adapter and an installation adapter cup configured to attach to and be moved by the forcing screw;
- wherein the stud removing head and the installation adapter cup define a bore hole therethrough and the stud removing head and extension adapter are dimensioned to push the stud through the stud removing head and C-frame when the forcing screw is moved toward the stud removing head.

2. The system of claim 1, further comprising a hex head on the forcing screw.

3. The system of claim 1, wherein the stud installing head is configured to be mounted in the receiver, the stud installing head having a depression in it located and sized to receive and fit over a wheel stud head when a wheel stud is being moved through a hole in a wheel by the forcing screw, and further wherein the bore hole extends through the depression in the stud installing head.

4. The system of claim 3, further comprising a narrow diameter section of the stud installing head sized to fit into a receiver hole and a larger diameter section sized to not fit into the receiver hole.

5. The system of claim 3, further comprising a cross screw and a threaded hole in the receiver wherein the cross screw is configured to enter into the threaded hole and secure the stud installing head to the C-frame.

6. The system of claim 1, wherein the stud removing head is configured to fit onto the C-frame having a hole extending through the removing head, the hole aligned with the forcing screw when the removing head is mounted on the C-frame.

7. The system of claim 6, further comprising a narrow diameter section of the stud removing head sized to fit into a receiver hole and a larger diameter section sized to not fit into the receiver hole.

8. The system of claim 6, further comprising a cross screw and a threaded hole in the receiver and the cross screw enters into the threaded hole and secure the stud removing head to the C-frame.

9. The system of claim 1, wherein the installing cup adapter comprises:

- a long body;
- a deep hole defined by the body positioned at one end of the body, the deep hole dimensioned to have a diameter sufficient to permit a wheel stud to fit into the hole;
- a second end of the body having a second hole dimensioned to receive the swivel; and
- wherein the second end of the body defines a bore hole which connects the deep hole and the second hole.

10. A wheel stud installing and removing system comprising:

- a frame;
- means for forcing configured to communicate with the frame to move laterally through the frame;
- means for swiveling mounted on an end off the means for forcing;
- means for receiving a head mounted on an opposite end of the frame from the mean for forcing; and
- an extension adapter and an installation adapter configured to attach to and be moved by the means for forcing, wherein the installation adapter defines a bore hole therethrough and when a stud removing head is located in the means for receiving a head, the stud removing head and extension adapter are dimensioned to push the stud through the stud removing head and frame when the means for forcing is moved toward the stud removing head.

11. The system of claim 10, wherein a stud installing head is configured to be mounted in the means for receiving a head, the stud installing head having means for securing a head of a stud when a wheel stud is being moved through a hole in a wheel by the means for forcing.

12. The system of claim 10, wherein the stud removing head is configured to fit onto the frame having a hole extending through the removing head, the hole aligned with the means for forcing when the head is mounted on the frame.

* * * * *